United States Patent [19]

Cohrs et al.

[11] Patent Number: 5,687,227
[45] Date of Patent: Nov. 11, 1997

[54] TELEPHONE WITH USER RECORDED RINGING SIGNAL

[75] Inventors: Paul Wesley Cohrs; Donald Marion Keen, both of Indianapolis, Ind.

[73] Assignee: Lucent Technologies, Inc., Murray Hill, N.J.

[21] Appl. No.: 452,624

[22] Filed: May 25, 1995

[51] Int. Cl.⁶ .................................. H04M 3/02; H04M 1/56
[52] U.S. Cl. ........................ 379/374; 379/373; 379/76; 379/142; 379/388; 379/410
[58] Field of Search ........................ 379/373, 374, 379/375, 252, 253, 76, 142, 410, 418, 388

[56] References Cited

U.S. PATENT DOCUMENTS

| H118 | 9/1986 | Biggs et al. ................ 379/374 X |
|---|---|---|
| 4,856,055 | 8/1989 | Schwartz ..................... 379/374 |
| 4,899,358 | 2/1990 | Blakley ....................... 379/88 |
| 5,016,271 | 5/1991 | Ford .......................... 379/388 X |
| 5,187,734 | 2/1993 | Takahashi et al. ............. 379/79 |
| 5,323,458 | 6/1994 | Park et al. ................... 379/390 |
| 5,388,150 | 2/1995 | Schneyer et al. .............. 379/374 X |
| 5,481,599 | 1/1996 | MacAllister et al. ........... 379/374 X |
| 5,483,577 | 1/1996 | Gulick ........................ 379/88 X |
| 5,493,611 | 2/1996 | Hubert ........................ 379/252 X |
| 5,517,561 | 5/1996 | Redden ........................ 379/374 X |

FOREIGN PATENT DOCUMENTS

| 4222977 | 1/1994 | Germany ................... 379/374 |
|---|---|---|
| 3-224394 | 10/1991 | Japan ...................... 379/375 |
| 2193419 | 2/1988 | United Kingdom ............ 379/374 |

OTHER PUBLICATIONS

Patent No. 4,866,766, filed on Sep. 6, 1988 and issued on Sep. 12, 1989 to James E. Mitzlaff. Class:379/374.
Patent No. 5,007,046, filed on Dec. 28, 1988 and issued on Apr. 9, 1991 to Richard H. Erving et al. Class:370/32.1.
Patent No. 5,365,583, filed on Sep. 11, 1992 and issued on Nov. 15, 1994 to Shan-Shan Huang et al. Class:379/390.
Patent No. 5,172,408, filed on Aug. 1, 1990 and issued on Dec. 15, 1992 to Norman W. Petty et al. Class:379/215.
Newton, Harry; "Newton's Telecom Dictionary", 8th ed., pp. 324–325 Nov. 1994.

Primary Examiner—Krista M. Zele
Assistant Examiner—Devendra T. Kumar
Attorney, Agent, or Firm—Thomas Stafford; Brian K. Dinicola

[57] ABSTRACT

A telephone ringing system in which one or more user-selected sound segments are received using the microphone portion of a telecommunications instrument, stored in digital or analog form, and audibly reproduced using the loudspeaker portion of the telecommunications instrument when a ring signal is detected to provide a distinctive, personalized indication of an incoming call.

18 Claims, 3 Drawing Sheets

TELEPHONE WITH USER RECORDED RINGING SIGNAL

TECHNICAL FIELD

This invention relates, in general, to ring signaling in telephones, and more particularly, to telephone devices which can audibly reproduce distinctive, user selected alerting signals.

BACKGROUND OF THE INVENTION

Known techniques for activating the ringer in a telephone set fall into two general categories. The first category encompasses direct techniques, wherein a subaudible voltage signal is placed on the subscriber line in order to directly power the ringer in the telephone set. The second area includes indirect techniques, wherein a specific analog or digital signal is placed on the subscriber line in order to activate a ringing device which contains circuitry to detect the presence of the ringing signal on the subscriber line.

The above techniques suffer from one principal drawback, namely that there is little or no opportunity to alter the audible ringing or alerting signal so that the telephone set produces a distinctive, audible alerting signal that is personalized to an individual user or group of users. Various telephones have been proposed in which a distinctive ringing signal is incorporated. In most cases, however, the pattern of the audible ringing (i.e., pulse duration and timing within the ringing interval) is strictly fixed by and dependent upon the pattern of direct or indirect ringing signals placed on the subscriber line by the telephone switching office.

There is therefore a need for a telephone which enables the user to truly customize the alerting signal.

SUMMARY OF THE INVENTION

According to the present invention, the above deficiencies are overcome by a telephone ringing system in which one or more user-selected sound segments are stored in digital or analog form and audibly reproduced when a ring signal is detected. In this manner, the stored sound segments may be used to alert the user to an incoming call or other occurrence in a distinctive, personalized way. The present invention is especially suited for implementation in speakerphones since such phones typically already include the hardware and programmability needed to store and audibly reproduce sound segments which the user may wish to employ as the alerting signal. Thus, in accordance with an illustrative embodiment of the present invention, sound signals representative of the desired sound segments are received by the microphone of the speakerphone, converted into digital signals by an A/D converter, and processed and stored in memory under the direction of a digital signal processor. As will be readily appreciated by those skilled in the art, some or all of the above identified components are currently utilized in conventional speakerphones to provide such functionality as, for example, echo cancellation and the like.

BRIEF DESCRIPTION OF THE DRAWINGS

The features of the present invention which are believed to be novel are set forth with particularity in the appended claims. The invention, together with further features and advantages thereof, may best be understood by making reference to the following description taken together with the accompanying drawings, in which:

DETAILED DESCRIPTION

The present invention is directed to a telephone set having personalized alerting capability. More particularly, the present invention is directed to a telephone set having programmable input capabilities which enable a user-selected, personalized alerting signal to be recorded and, when an incoming call is received, audibly reproduced. As indicated previously, the present invention is especially suited for implementation in speakerphones since these telephone devices are typically provided with the hardware necessary to process and store acoustically received sound signals for subsequent reproduction.

Figure 1:
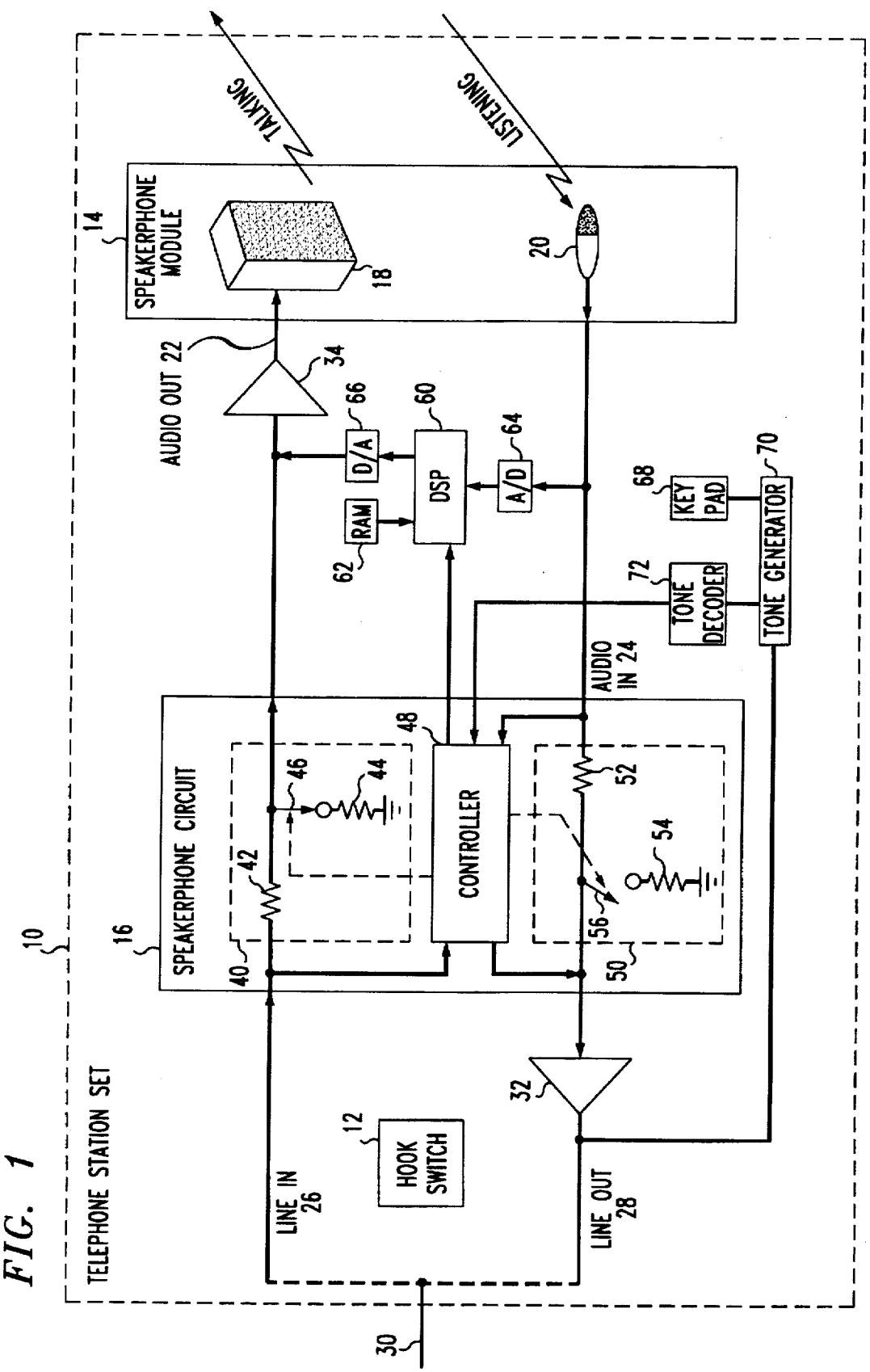
FIG. 1 is a block diagram of a telephone system incorporating a telephone set in which a user-selected alerting signal is stored and reproduced when a ringing signal is detected, according to the present invention.

In FIG. 1, there is shown a telephone station set 10, which is a conventional set but for modifications described herein. As is conventional, set 10 includes a hookswitch 12, a conventional speakerphone module 14, and a conventional speakerphone circuit 16 for controlling the operation of speakerphone module 14. Speakerphone module 14 includes a loudspeaker 18 and a microphone 20. The input of loudspeaker 18 and the output of microphone 20 are connected to speakerphone circuit 16 by an AUDIO OUT line 22 and an AUDIO IN line 24, respectively.

Speakerphone circuit 16 connects lines 22 and 24 to LINE IN line 26 and LINE OUT line 28, respectively. Lines 26 and 28 are in turn connected, through conventional circuitry of set 10 (not shown) to a telephone line 30. Audio, e.g., voice, signals incoming on telephone line 30 appear on LINE IN line 26, and audio signals outgoing on telephone line 30 are supplied thereto by LINE OUT line 28. An output of speakerphone circuit 16 is connected to LINE OUT line 28 through a conventional amplifier 32. Similarly, a second output of speakerphone circuit 16 is connected to AUDIO OUT line 22 through a conventional amplifier 34. Amplifiers 34 and 32 merely boost the signal strength of signals incoming thereto and transmit the boosted signals at their outputs.

LINE IN line 26 is connected to the input of amplifier 34 through a switched attenuator circuit 40 of speakerphone circuit 16. Circuit 40 is illustratively a conventional voltage-divider circuit that has a first resistor 42 in line with the input of amplifier 34, and a second resistor 44 that is selectively switched between ground and the signal path between LINE IN line 26 and amplifier by a switch 46. Operation of switch 46 is controlled by a controller 48 of speakerphone circuit 16. Similarly, AUDIO IN line 24 is connected to the input of amplifier 32 through a switched attenuator circuit 50 of speakerphone circuit 16. Circuit 50 duplicates circuit 40 and includes a first resistor 52 in line with the input of amplifier 32, and a second resistor 54 that is selectively switched between ground and the signal path between AUDIO IN line 24 and amplifier 32 by a switch 56. Operation of switch 56 is also controlled by controller 48.

Figure 2:
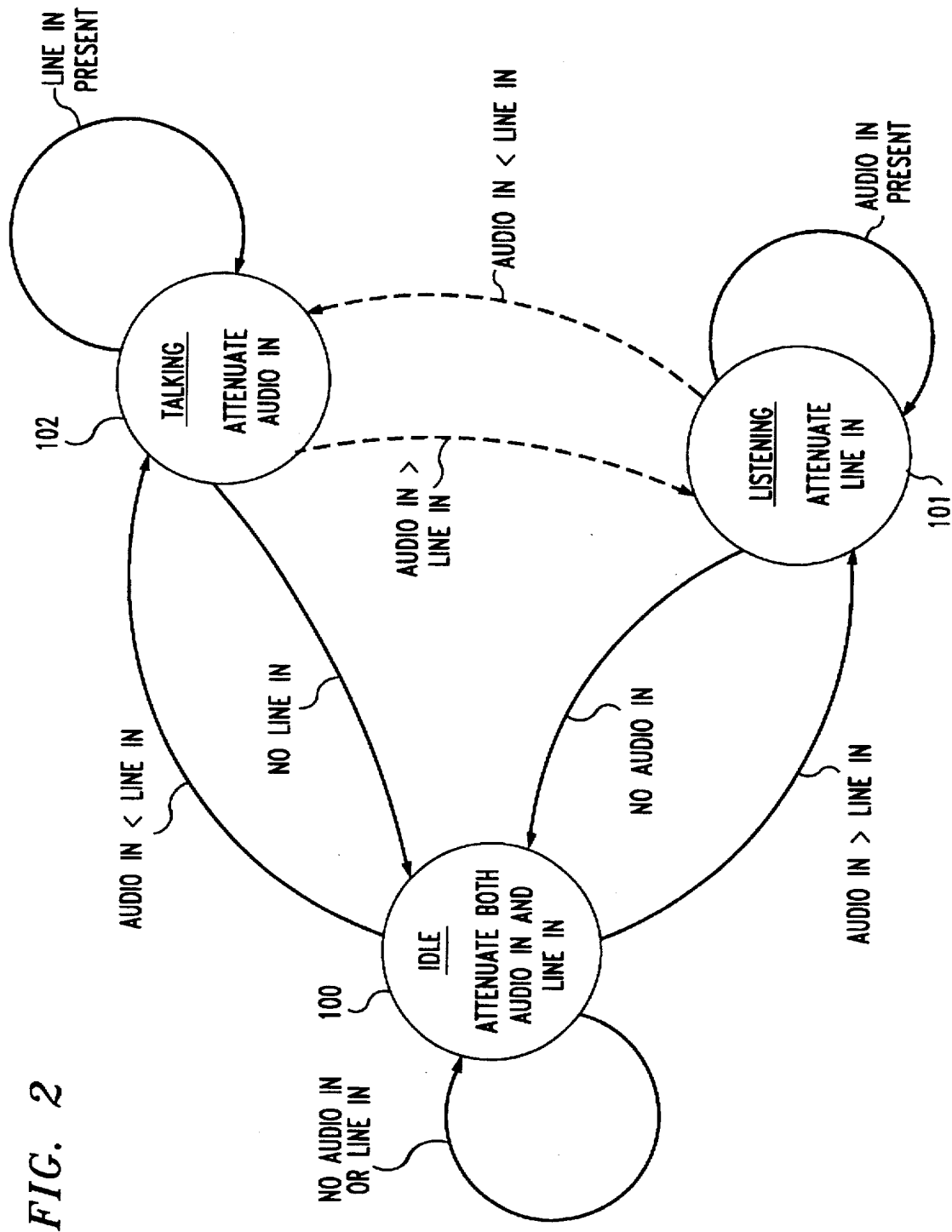
FIG. 2 is a state diagram of the states of the speakerphone circuit of the set of FIG. 1.

Controller 48 exerts control on circuits 40 and 50 in response to activity that it senses on AUDIO IN line 24 and LINE IN line 26 and, in a manner that illustratively creates three operational states for circuit 16. This is illustrated in FIG. 2. When no input signals (neither signals on LINE IN line 26 nor signals on AUDIO IN line 24) are present, controller 48 sets circuit 16 into idle state 100, wherein both resistors 44 and 54 are switched into their respective signal paths. When controller 48 senses the presence of input signals, it causes circuit 16 to leave idle state 100 and to assume one of listening state 101 and talking state 102, depending upon the relative strength-volume-of the line in and audio in signals. If the audio in signals are stronger than the line in signals, controller 48 causes circuit 16 to assume listening state 101, wherein resistor 44 is switched into its signal path to attenuate the line in signals input to loudspeaker 18. If the audio in signals are weaker than the line in signals, controller 48 causes circuit 16 to assume talking state 102, wherein resistor 54 is switched into its signal path to attenuate the output of microphone 20 to LINE OUT line 28.

Typically, if listening state 101 is assumed by circuit 16, controller 48 will keep circuit 16 in state 101 for as long as audio in signals are present, and will return circuit 16 to idle state 100 upon detecting absence of the audio in signals. Likewise, if talking state 102 is assumed by circuit 16, controller 48 will keep circuit 16 in state 102 for as long as line in signals are present, and will return circuit 102 to idle state 100 upon detecting the absence of the line in signal. In idle state 100, the above-described check of the relative strengths of the audio in and line in signals is then repeated. Alternatively, though, it is possible for controller 48 to switch between talking state 102 and listening state 101 as the relative signal strengths of the audio in and the line in signals change, and for idle state 100 to be resumed only when controller 48 ceases to sense any input signals. This alternative is shown by dashed lines in FIG. 2. It is not a favored alternative from a human factors standpoint.

As described so far, telephone station set 10 and its operation are conventional. Conventionally, telephone station set 10 would also include an alerting tone generator, e.g., ringing tone generator, operable when set 10 is on-hook and connected directly to the input of loudspeaker 18, for driving loudspeaker 18 with alerting signals that cause loudspeaker 18 to produce audible alerting signals. However, according to the present invention, the function of the ringing tone generator is performed by an audio signal processing and storage system by which sound segments selected by the user are stored and retrieved as necessary to supply the alerting signal to the loudspeaker 18. Microphone 20 of speakerphone 14 is ideally suited for this purpose as it may be used to convert acoustic signals received from any acoustical signal source such, for example, as a portable stereo system, tape player, or the like, into audio signals representative of the user-selected sound segment.

The audio signals representing the alerting signal may be processed and stored in a number of ways. By way of illustrative example, they may be stored in analog form utilizing a suitable recording medium. In the embodiment depicted in FIG. 1, however, these audio signals are digitally processed in a conventional manner by a digital signal processor (DSP) 60 and stored in a suitable memory device such as a Random Access Memory (RAM) 62. It will, of course, be readily appreciated by those skilled in the art that other memory devices may be employed. By way of additional example, the memory device might alternatively be configured as an erasable-programmable read only (EPROM) device. To facilitate digital processing of the alerting signal, an audio-to-digital converter (A/D) 64 is coupled to the output of microphone 20 and to an input of DSP 60. Similarly, a digital-to-audio converter coupled to the output of the DSP 60 and to the input of amplifier 34 is utilized to provide the corresponding analog signal for audible reproduction by loudspeaker 18.

As will be ascertained by those skilled in the art, the set 10 of the present invention is operable to store and audibly reproduce any desired audio sound selection selected by the user such, for example, as a currently favored song, sound effects from movies, and the like. Programming of the set 10 is performed in a conventional manner utilizing, for example, the key pad 68 and dial tone generator 70 of set 10. Illustratively, tone generator 70 may be configured as a Dual Tone Multiple Frequency (DTMF) generator responsive to the keypad 68. Accordingly, keypad 68 may be utilized by the user to generate tone sequences representative of instructions to begin and end storage of a selected sound segment. A tone decoder 72 is provided for decoding the keypad output provided through the tone generator 70 and for producing, in response thereto, a unique digital code word for each detected DTMF tone. These code words, provided by the tone decoder 72, are received by the controller 48 and utilized, in a conventional manner, to control the operation of DSP 60. The audio signal representative of the alerting signal sound segment is digitally converted by A/D 64, filtered and compressed in a conventional manner by DSP 60, and stored in RAM 62.

The alerting operation of the above-described circuitry of set 10 is as follows. When set 10 is on-hook, no audio signals are present and speakerphone circuit 16 is in idle state 100. When set 10 receives notice of an incoming call, DSP 60 is caused by controller 48 to generate and output digital alerting signals corresponding to the user-selected sound segment(s). The alerting signals pass through D/A converter 66 to amplifier 34, are amplified thereby, and then pass through AUDIO OUT line 22 to the input of loudspeaker 18. When set 10 receives notice of abandonment of the incoming call before set 10 goes off-hook, or when set 10 goes off-hook, DSP 60 is caused to cease producing alerting signals and the audible alerting signals produced by loudspeaker 18 stop. If set 10 has gone off-hook, the call proceeds conventionally.

Figure 3A:
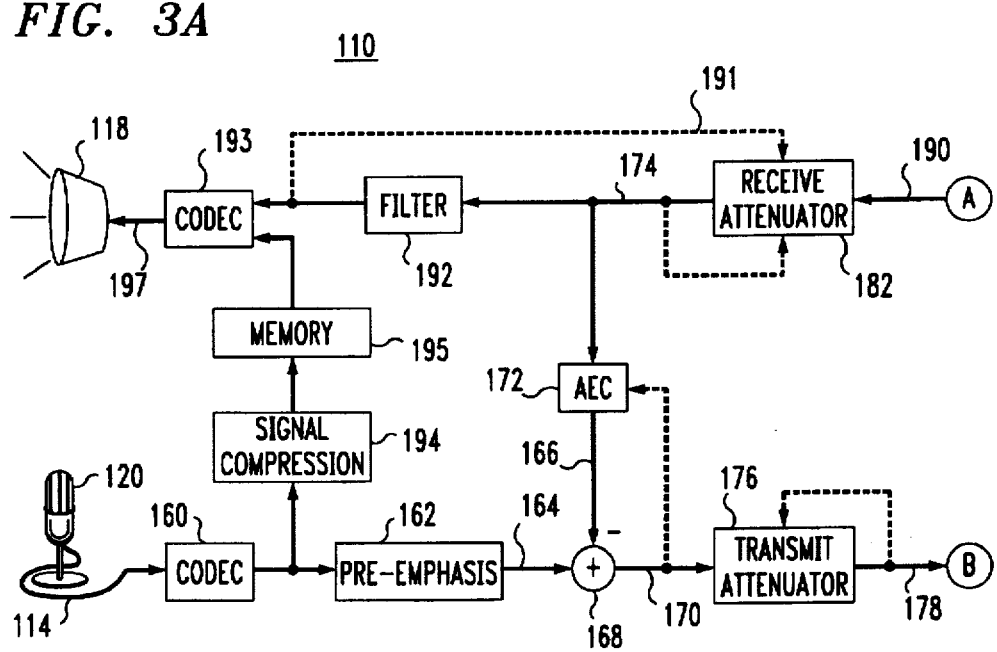
FIGS. 3A and 3B are block diagrams illustrating major components of a speakerphone constructed in accordance with an alternate embodiment of the present invention.
Figure 3B:
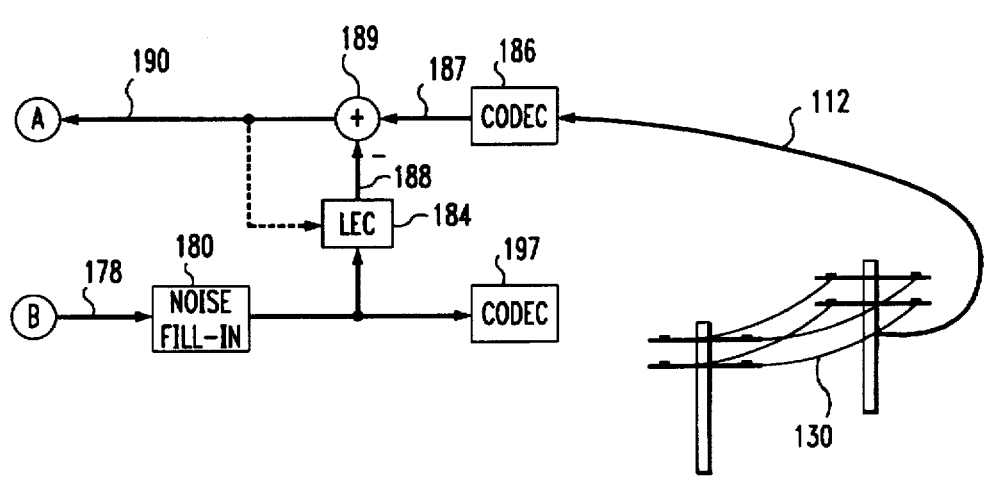

FIGS. 3A and 3B show an alternative embodiment of the alerting arrangement of the present invention in which both alerting signal processing and echo cancellation functions are performed by a single digital signal processor. In FIGS. 3A and 3B, there is shown a speakerphone 110 comprising two originating signal paths, including speaker signal 112 and microphone signal 114. The functions shown in FIGS. 3A and 3B of speaker phone 110 are largely digitally implemented using conventional digital signal processing hardware. In the illustrative embodiment, a DSP16A (commercially available from AT&T) digital signal processor is used in conjunction with conventional memory and hardware logic components. The speaker signal 112 comes from the far-end via telephone line 130, propagates to and through the near-end speaker 118, and is heard by listeners in the near-end. Speech originating from the near-end is detected by microphone 120 and transmitted to the far-end along telephone lines 130. The microphone signal 114 coming from the near-end can also include echo coming from the far-end via speaker 118. The primary purpose for digitally processing these speaker and microphone signals 112, 114 is to remove the echoes in microphone signal 114 so that listeners in the far-end will only hear the near-end talkers, not their own voices coming back after the round-trip delay of telephone transmission. Signal processing also removes the echoes and side tones in speaker signal 112 so that only the far-end speech can be heard in the near-end.

Analog signals produced by talkers in the near-end are picked up by microphone 120, low-pass filtered and digitized at 8 kilohertz into 16-bit integers by codec 160. In the illustrative embodiment of FIGS. 3A and 3B, codec 160 may be implemented using a model 7525 codec commercially available from AT&T. The digitized signal is then processed through a high-pass pre-emphasis filter 162 of conventional design in order to boost the high-frequency components to improve the performance of the echo cancelers. Processed signal 164 is combined with Acoustic Echo Canceler (AEC) signal 166 in summer 168 to produce summer output 170. Acoustic Echo Canceler (AEC) 172 samples attenuator output 174 as its reference signal and provides a simulated echo signal which, when subtracted from processed signal 164 removes the speaker signal 112 component from the processed signal 164, in summer 168. Summer output 170 feeds back into AEC 172 in order to provide AEC 172 with a feedback signal from which cancellation effectiveness can be measured. Acoustic Echo Cancelers are known in the telephone art and a detailed description of the same has been omitted in the belief that the same is unnecessary for an understanding of the invention. Additional information on Acoustic Echo Cancelers can, however, be found in "Acoustic Echo Cancellation with the WE DSP16A Digital Signal Processor," by S. M. Kuo and H. Zhao, AT&T application note.

Following echo cancellation in summer 168, summer output 170 is conditioned in a digital transmit attenuator 176 which controls the overall gain of the transmit path from microphone 120 to telephone line 130. Attenuator output signal 178 is next conditioned by noise fill-in 180 which compensates for the variations in background noise level in a known manner such, for example, as the technique described in U.S. Pat. No. 5,365,583 issued to Huang et al. and assigned to the assignee of the present application. Transmit attenuator 176 and receive attenuator 182 insert appropriate amounts of attenuation into the speaker and microphone signal paths while speaker phone 110 is operating. Attenuators 176 and 182 ensure the system loop stability when the adaptive filters of the AEC 172 and Line Echo Canceler 184 are not fully converged and enhance the performance of both echo cancelers 172, 184 when speakerphone 110 is in normal operation. As attenuator 176 adjusts to reduce the signal transmission level and maintain loop stability, the level of the background noise is also proportionally reduced. Thus, the far-end users can hear the variations in the background noise level. It not only is annoying, but also gives a perception of being in the half-duplex operation mode even though speakerphone 110 is operating in full-duplex. The noise fill-in 180 operates to supplement the near-end transmit signals with a suitable amount of noise energy to alleviate this artifact. Conventional techniques for generating and adding pseudo random white noise are used. See "WE DSP16 and DSP 16A Application Software Library Reference Manual" by AT&T, October 1989.

Speaker signal 112 from telephone lines 130 is low-pass filtered and digitized at 8 kilohertz by codec 186. The digitized speaker signal 187 is combined with Line Echo Canceler (LEC) signal 188 in summer 189 to produce summer output 190. As in AEC 172, LEC 184 uses an adaptive filter to model the impulse response of the sidetones coming from the near-end signals via microphone 120. The replica of the sidetones is then eliminated from the speaker signals 187 to prevent the near-end talkers from hearing their own voices coming back. Similar to the adaptive filter in AEC 172, a conventional normalized least mean square algorithm is used. Summer output 190 is fed back to LEC 184 to measure the effectiveness of the echo cancellation.

Following echo cancellation on the receive side, summer output 190 connects to receive attenuator 182, which functions in a manner similar to that of transmit attenuator 176, and acts as a control point for maintaining a stable overall system loop gain. Attenuator output 174 is then processed by filter 192 in order to compensate for any spectral variations which will be introduced by speaker 118. The output signal of filter 192 is selectively fed back in signal 191 to enhance stability, as described below. Conversion from a digital signal at the output of filter 192 to an analog signal occurs in codec 193, and the analog signal 197 is transduced for the near-end listener by speaker 118.

In accordance with the present invention, the DSP (not shown) which implements the above identified echo cancellation functions is further configured to implement the processing, storage, and retrieval of the user-selected audio segment(s) corresponding to alerting signals. Thus, in response to entry, as by keypad in the manner described above, of an instruction to receive and store a new alerting signal sound segment, the signal processed by codec 160 is compressed in signal compression module 194 and stored in memory 195. Upon the detection of a ringing signal or other signal indicative of an incoming call, the stored signal is retrieved and directed to codec 193 for conversion into an analog alerting signal which is transduced by speaker 118 for the user.

As will be readily appreciated by those skilled in the art, the user selected alerting signal of the present invention may be extended to any telecommunications instrument having the requisite acoustical transducers and thus need not be limited to speakerphone configurations. Accordingly, a general implementation is shown in FIG. 4.

Figure 4:
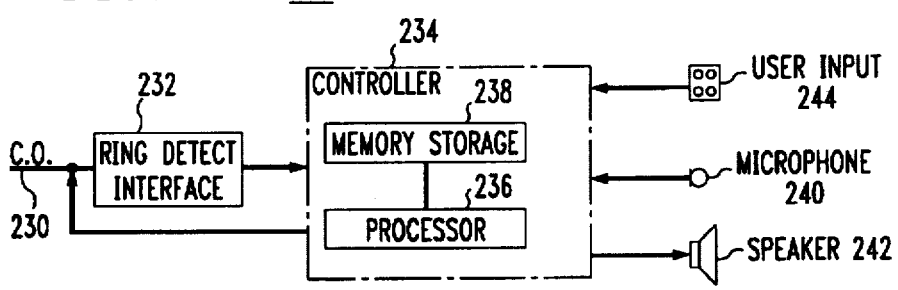
FIG. 4 is a block diagram of a general implementation of a telecommunications instrument constructed in accordance with the present invention.

As shown in FIG. 4, the most basic implementation of the present invention comprises a telecommunications instrument 200 having a ring detect interface 232 for providing controller 234 with an input signal representative of a detected network ring signal on line 230, the ring signal illustratively originating from a central office (C.O.). Controller 234 includes a processor 236 and memory storage module 238 and controls the operations of the telecommunications instrument in a conventional fashion. A user input device 244, which may comprise a conventional keypad and tone generator, provides controller 234 with an instruction to initiate alert signal recording in the manner previously described in connection with the illustrative embodiments of FIGS. 1 and 3. For this purpose, microphone 240 is operatively coupled to controller 234 so as to receive acoustical input from the user.

When a signal representative of an incoming call is detected by ring detect interface 232, controller 234 provides speaker 242 with driving signals (which signals may be stored in analog form and supplied directly or stored in digital form and converted by a D/A converter in the manner previously described in connection with the embodiments of FIGS. 1 and 3). During this time, telecommunications instrument 200 remains on-hook. When an on-off hook switch or other device (not shown) detects that the user has answered the call, two-way communication between the called and calling party is established in a conventional manner.

Advantageously, telecommunications instrument 200 may be implemented in a telephone answering device which, like a speakerphone, already possesses the requisite microphone, speaker, and sound segment storage capability. Illustratively, both an outgoing message and a user-selected sound selection may be acoustically transduced and stored in memory storage unit 238. Prior to detecting an off-hook condition, the latter is audibly reproduced in response to an incoming call. If the user fails to answer within the selected ringing interval, controller 234 drives speaker 242 with signals corresponding to the outgoing message and also supplies these signals to the calling party via line 230.

It is also contemplated that telecommunications instrument 200 may be configured for multiple line operation. Thus, if desired, a plurality of alerting signals may be stored in memory storage unit 238 to provide a distinctive ringing signal for each input line.

It should, of course, be noted that while the present invention has been described in reference to illustrative embodiments, other arrangements may be apparent to those of ordinary skill in the art. For example, while the disclosed embodiments utilize discrete devices, these devices can be implemented using one or more appropriately programmed processors, special-purpose integrated circuits, digital processors, or an analog or hybrid counterpart of any of these devices. Moreover, many enhancements can be incorporated into the speakerphone of the present invention in order to take advantage of, for example, automatic number identification signals. Illustratively, the memory of a speakerphone constructed in accordance with the present invention may be configured to store plural sound segments, each associated, for example, with a particular caller or identified group of callers. Upon detection of a call placed by one's mother-in-law, for example, audible reproduction of a segment from an appropriate musical selection may be initiated.

In view of the above explanation, it will be appreciated that embodiments of the present invention may be employed in many applications to audibly reproduce an acoustically received sound segment as an alerting signal upon the receipt of an incoming call. Thus, while certain exemplary operations have been stated herein, and certain detailed structures have been disclosed, the appropriate scope hereof is deemed to be in accordance with the claims as set forth below.

What is claimed:

1. A telephone station set comprising:
    a speakerphone including a loudspeaker, a microphone and a signal storage unit operable to store a representation of an outgoing message for delivery to a calling party; and
    a signal processing system including a digital signal processor operatively associated with said microphone and said loudspeaker for storing a digital representation of a user-selected sound segment received as an acoustical signal by said microphone, said signal processing system being responsive to an alerting signal received by said station set to cause said loudspeaker to audibly reproduce said user-selected sound segment without communicating the alerting signal to the calling party and to thereby indicate an incoming call, and said digital signal processor being further operable to perform echo cancellation between a transmit and receive path of said telephone station set.

2. The telephone station set of claim 1, wherein said signal processing system further comprises an analog-to-digital converter coupled between said microphone and said digital signal processor for converting audio signals transduced by said microphone into digital signals.

3. The telephone station set of claim 1, wherein said signal processing system further comprises a digital-to-analog converter coupled between said digital signal processor and said loudspeaker for converting digital signals supplied by said digital signal processor into analog signals to be audibly reproduced by said loudspeaker.

4. The telephone station set of claim 1, wherein said digital signal processor includes a first coder-decoder, memory and a second coder-decoder, said first coder-decoder being coupled between said microphone and said memory for converting audio signals transduced by said microphone into digital signals, said memory storing said digital signals received from the first coder-decoder, and said second coder-decoder being coupled between said memory and said loudspeaker for converting the digital signals supplied by said memory into analog signals to be audibly reproduced by said loudspeaker.

5. The telephone station set of claim 4, wherein said digital signal processor is operatively configured for receiving automatic number identification signals, each automatic number identification signal being associated with a calling party and said digital signal processor being further operable for storing a plurality of user-selected sound segments.

6. The telephone station set of claim 5 wherein said digital signal processor, responsive to receipt of an automatic number identification signal, audibly reproduces in the speakerphone a particular associated one of the user-selected sound segments.

7. The telephone station set of claim 5 wherein said digital signal processor, responsive to receipt of automatic number identification signals, each identification signal being associated with an identified group of calling parties, audibly reproduces in the speakerphone a particular one of the user-selected sound segments.

8. A telephone station set comprising:
    a speakerphone having a loudspeaker and a microphone, said microphone being operable to receive acoustic signals representative of a user-selected alerting signal while the station is in an on-hook condition and to generate audio signals corresponding thereto;
    a signal storage unit that is responsive to said microphone and that stores a representation of said alerting signal, said signal storage unit being further operable to store a representation of an outgoing message for delivery to a calling party; and
    an audible reproduction system operatively associated with said signal storage unit for causing said loudspeaker to audibly reproduce an acoustic signal representative of said user-selected alerting signal in response to detection of an incoming call without communicating the alerting signal to the calling party.

9. The telephone station set of claim 8, wherein said representation is digital data.

10. The telephone station set of claim 9, wherein said storage unit is a RAM device.

11. The telephone station set of claim 9, wherein said signal storage unit is an erasable-programmable ROM device.

12. A method for operating a telephone station set to provide customized, user-selected alerting signals, said station set comprising a speakerphone having a loudspeaker and microphone, comprising the steps of:
    converting, with the microphone, acoustic signals corresponding to selected alerting signals into audio signals;
    operating, in a storing step, a signal processing system to store representations of said audio signals and a representation of an outgoing message for delivery to a calling party;

audibly reproducing, with the speakerphone, said selected alerting signals in response to detection of an incoming call; and operating, in an echo-cancellation step, the signal processing system to perform echo cancellation between a transmit and receive path of the telephone set.

13. The method of claim 12, further including digitally converting said audio signals into digital signals, prior to said storing step, to obtain said representations.

14. The method of claim 13, wherein said step of audibly reproducing includes converting the stored representations into analog signals.

15. The method of claim 12 further including the step of receiving automatic number identification signals, each automatic number identification signal being associated with a calling party and said storing step includes storing a plurality of said customized user-selected alerting signals.

16. The method of claim 15 further including the step of audibly reproducing in the speakerphone an associated one of the user-selected alerting signals in response to receipt of an automatic number identification signal associated with a particular calling party.

17. The method of claim 15 further including the step of audibly reproducing in the speakerphone an associated one of the user-selected alerting signals in response to receipt of automatic number identification signals, each identification signal being associated with an identified group of calling parties.

18. A telecommunications instrument for establishing communication between a calling party and a called party comprising:

a loudspeaker;

a microphone for receiving acoustic signals representative of plural alerting signals selected by the called party;

means for detecting a signal containing automatic number identification information and representative of an incoming call; and a signal processing system operatively associated with said microphone and said loudspeaker for storing representations of said plural user selected alerting signals, said signal processing system being responsive to said detecting means to cause said loudspeaker to audibly reproduce a particular one of said user selected alerting signals associated with said automatic number identification information of said calling party, said loudspeaker audibly reproducing said user-selected alerting signal without communicating the alerting signal to the calling party and to thereby indicate the incoming call, and said signal processing system being further operative to store an outgoing message and to supply signals representative of the outgoing message to the calling party.

\* \* \* \* \*